United States Patent
Williams

(10) Patent No.: US 9,372,340 B2
(45) Date of Patent: Jun. 21, 2016

(54) BALL JOINT GIMBAL IMAGING SYSTEM WITH AN OFF-GIMBAL DIRECTIONAL ELECTRO-OPTIC COMPONENT

(71) Applicant: Raytheon Company, Waltham, MA (US)

(72) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 105 days.

(21) Appl. No.: 14/267,437

(22) Filed: May 1, 2014

(65) Prior Publication Data

US 2015/0316761 A1 Nov. 5, 2015

(51) Int. Cl.
| | |
|---|---|
| *G02B 7/182* | (2006.01) |
| *G02B 26/08* | (2006.01) |
| *F42B 15/01* | (2006.01) |
| *G02B 7/00* | (2006.01) |
| *G01B 11/27* | (2006.01) |
| *F41G 7/22* | (2006.01) |

(52) U.S. Cl.
CPC .............. *G02B 26/08* (2013.01); *G01B 11/272* (2013.01); *G02B 7/005* (2013.01); *F41G 7/2293* (2013.01); *G02B 7/1821* (2013.01)

(58) Field of Classification Search
CPC .................................................... G02B 7/1821
USPC .......... 359/841, 843; 244/3.1, 3.15, 3.16, 3.17
See application file for complete search history.

(56) References Cited

U.S. PATENT DOCUMENTS

| | | | |
|---|---|---|---|
| 3,376,578 A | | 4/1968 | Sawyer |
| 4,009,393 A | * | 2/1977 | Ashley, Jr. ............ F41G 7/2213 235/411 |
| 4,076,344 A | | 2/1978 | Gaines et al. |
| 4,123,134 A | * | 10/1978 | Meyers ................. F41G 7/2213 244/3.16 |
| 4,329,579 A | * | 5/1982 | Jansen .................. F41G 7/2213 250/203.1 |
| 4,879,460 A | * | 11/1989 | Schleimann-Jensen F41G 7/2213 250/216 |
| 5,011,320 A | | 4/1991 | Love et al. |
| 5,012,367 A | | 4/1991 | Toensing |

(Continued)

OTHER PUBLICATIONS

Anders et al., "A Novel Spherical Linear PM Motor for Direct Driving Optical Telescope," IEEE, 1999, pp. 528-530.

(Continued)

*Primary Examiner* — Thomas K Pham
*Assistant Examiner* — Nicholas R Pasko
(74) *Attorney, Agent, or Firm* — Eric A. Gifford

(57) ABSTRACT

A ball joint gimbal imaging system includes on-gimbal optics that reimage a front optical aperture to a smaller back optical aperture that moves with the rotation of the inner ball. Relay optics are configured to relay the back optical aperture to an electro-optic component mounted on the platform, off-gimbal. Relay optics includes a first two-axis steering element (on or off-gimbal) that is positioned and sized to cover the range of motion of the beam from the back optical aperture across the range of gimbal motion. The first two-axis steering element is controlled to steer the optical beam passing through the back optical aperture into a second off-gimbal two-axis steering element that is controlled to tilt the optical beam to align light along the central axis of the electro-optic element with the central axis of the front optical aperture on the inner ball, which is coincident with the gimbal pointing axis.

16 Claims, 6 Drawing Sheets

(56) References Cited

U.S. PATENT DOCUMENTS

| | | | | |
|---|---|---|---|---|
| 5,538,205 | A * | 7/1996 | Bitson | F41G 7/008 |
| | | | | 244/3.16 |
| 5,779,187 | A * | 7/1998 | Dulat | F41G 7/2213 |
| | | | | 244/3.16 |
| 6,326,759 | B1 | 12/2001 | Koerner et al. | |
| 6,396,233 | B1 * | 5/2002 | Christison | G05B 5/01 |
| | | | | 244/3.16 |
| 6,820,846 | B2 | 11/2004 | Knoski | |
| 7,032,469 | B2 | 4/2006 | Bailey | |
| 7,175,095 | B2 | 2/2007 | Pettersson et al. | |
| 7,290,719 | B2 | 11/2007 | Ladas et al. | |
| 7,388,700 | B1 * | 6/2008 | Odhner | G02B 7/1821 |
| | | | | 359/224.1 |
| 8,047,739 | B2 | 11/2011 | Sellers et al. | |
| 8,212,880 | B2 * | 7/2012 | Anderson | H04N 5/2252 |
| | | | | 348/208.7 |
| 8,334,490 | B2 * | 12/2012 | Schaub | F41G 7/224 |
| | | | | 244/3.16 |

OTHER PUBLICATIONS

John J. Stickler, "A Study of Single-Sided Linear Induction Motor Performance with Solid Iron Secondaries," IEEE Transactions on Vehicular Technology, vol. VT-31, No. 2, May 1982, pp. 107-112,.

Hoshina et al. "Development of Spherical Ultrasonic Motor as a Camera Actuator for Pipe Inspection Robot," The 2009 IEEE/RSJ International Conference on Intelligent Robots and Systems, Oct. 11-15, 2009, pp. 2379-2384.

* cited by examiner

BALL JOINT GIMBAL IMAGING SYSTEM WITH AN OFF-GIMBAL DIRECTIONAL ELECTRO-OPTIC COMPONENT

RELATED APPLICATIONS

This application is related to co-pending U.S. patent application Ser. No. 14/267,302 entitled "Non-Contacting Electro-Magnetic Spherical Planar Motor Providing 3-Axis Control of a Ball Joint Gimbal Mounted Electro-Optic System."

BACKGROUND OF THE INVENTION

1. Field of the Invention

This invention relates to gimbaled imaging systems with an off-gimbal electro-optic source or detector, and more particularly to ball joint gimbal imaging systems with an off-gimbal directional electro-optic component in which on-gimbal optics reimage the front optical aperture to a smaller back optical aperture that moves with the rotation of the inner ball.

2. Description of the Related Art

An EO imaging system includes a fixed directional EO component such as a detector or laser source and a gimbal for controlling a pointing axis to move a field-of-view (FOV) of an optical system in two axes through a field of regard (FOR). In certain configurations, the EO component is mounted "on-gimbal" and rotates with the FOV. In other configurations, the EO component is mounted "off-gimbal" and remains fixed as the FOV rotates. In both cases, a front optical aperture is imaged into (or imaged from, for sources) the EO component. In some on-gimbal cases, the front aperture is first reimaged (or relayed) into to a smaller back optical aperture and through a pupil stop to limit stray light, and then imaged into the EO component. In "off-gimbal" configurations, a back aperture is formed (reimaged from the front aperture) to reduce the beam size so that light may be relayed off gimbal via coudé paths, through the gimbal axes, and then imaged into a off-gimbal EO component. These types of EO system may be used, for example, on aircraft or various types of munitions e.g. missiles, rockets, artillery shells, etc.

The classic method to control two-axis pointing of a pointing axis is to control (and measure) rotation separately in each of two axes (Roll/Nod, or Az/El which is also known as Yaw/Pitch) through a nested gimbal arrangement in which a first gimbal is mounted on a second gimbal. The axes of rotation of the first and second gimbals are perpendicular to each other such that each axis of the nested gimbal controls one axis of rotation. Gimbal drive motors are configured to mechanically rotate each gimbal about its axis. With a two axis system, the third rotational axis is kinematically constrained by the position of the first two gimbals. For example, a particular Az, El or yaw/pitch angle pair rigidly specifies a unique roll angle. Roll cannot be independently controlled without adding a third gimbal or some equivalent.

When the EO component is off gimbal, reimaging optics are implemented via coudé paths, where nominally collimated light is relayed through the rotation axis of each nested gimbal. In some embodiments, the optical coudé path may include at least two mirrors to provide a bi-directional communication path through an azimuth axis and an elevation axis of the gimbaled payload.

Another method to control two-axis pointing of a pointing axis is via a ball joint gimbal, in which an inner ball is captured within a socket. The inner ball is free to rotate about combinations of three orthogonal axes, except as constrained by the motor and control system. A motor is configured to apply forces to rotate the inner ball. Different motor configurations include ultrasonic motors, mechanical tendons and linear electro-magnetic permanent magnet motors. In some cases, notably tendon drives, the ball position is determined directly from the actuation system (rotary encoders on the tendon drives). In others, it is determined via separate gimbaled position readouts, attached about the ball. In still others, non-contact means are used to directly measure the position of the ball surface relative to a sensor.

In the prior art, ball gimbals do not allow for a conventional coudé path. On-gimbal configurations of the EO component place the component within the inner gimbal, so this is not an issue. Off-gimbal configurations that position the EO component off-gimbal are problematic. Unlike the classic nested gimbal configuration, the ball joint gimbal does not have fixed axes of rotation, so there is nowhere to place a coudé path to relay the optical aperture on the inner ball to the off-gimbal EO component.

Other systems use a ball gimbal which, unlike the systems here, does not contain imaging or reimaging (relay) optics, but which simply moves a flat mirror. These are not gimbaled systems, but rather, are strap-down systems with a gimbaled fold mirror. This moving mirror is placed within the optical path to redirect the optical rays, so that it serves as a beam steering element rather than as a directed optical subsystem. U.S. Pat. Nos. 6,326,759 and 7,032,469 are directed to a ball joint gimbal system that provides for a precise line-of-sight stabilization of a gimbaled mirror that rides on a ball and its associated support structure. The mirror is positioned by four braided lines driven by corresponding servo motors. A target image is formed on a fixed imager by reflecting the light off the gimbaled mirror along an optical path to a fixed mirror and then along a light path through focus optics to the fixed imager. The image of the target is stabilized in inertial space using the electrical signals from missile body mounted rate gyros to cause the gimbaled mirror to move the correct amount to compensate for the motion of the missile.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a ball joint gimbal imaging system with an off-gimbal directional EO component in which on-gimbal optics reimage the front optical aperture to a smaller back optical aperture that moves with the rotation of the inner ball. Reimaging to the smaller back optical aperture may reduce the packaging volume required for the relay optics. Relay optics are configured to relay the back optical aperture to the EO component. A motor applies forces to rotate the inner ball to move a pointing axis and FOV over a FOR and a position measurement device measures the rotational position of the inner ball.

In an embodiment, a relay optics system comprises a first two-axis steering element that is positioned and sized to cover the range of motion of the optical beam from the back optical aperture across the range of gimbal motion, a second two-axis steering element mounted to the platform, and a controller configured to drive the first and second steering elements. The controller is responsive to the rotational position of the inner ball to drive the first steering element to steer the optical beam passing through the back optical aperture into the second two-axis steering element, and to drive the second steering element to tilt the optical beam to substantially align light along the central axis of the electro-optic element with the central axis of the front optical aperture (coincident with the pointing axis) on the inner ball.

In an embodiment, there is no physical contact to or connection with the inner ball other than possibly through the gimbal bearing.

In an embodiment, the first two-axis steering element is mounted on the platform, off-gimbal. The two-axis steering element may comprise a two-axis steering mirror. All electrically powered components may be mounted off of the inner ball.

In an embodiment, the first two-axis steering element is mounted on-gimbal, on the inner ball. The two-axis steering element may comprise two-axis roll-nod prisms or fold mirrors. A non-contacting power source powers the first two-axis steering element. A non-contacting data path is provided from the off-gimbal control system to drive the first two-axis steering element, and possibly to provide feedback on the position of the steering element.

In an embodiment, the controller is configured to drive the first steering element to pre-compensate for wander of an input aperture of the second steering element as the steering of the second steering element changes.

In an embodiment, the system further comprises an alignment measurement element configured to measure residual misalignment of the optical path through the first and second steering elements between the axis of the front optical aperture and the axis of the EO element, providing high speed feedback to maintain alignment. The alignment measurement element may comprise an optical auto-collimator.

In an embodiment, the second two-axis steering element is controlled to provide Vernier stabilization. The line of sight (axis of the EO component) (as routed through the steering path) is intentionally misaligned with the axis of the front aperture to keep it stable in the external object space as the ball unintentionally jitters. In an embodiment, control of Vernier stabilization is aided by feedback from the alignment measurement element and an inertial angle rate sensor mounted on-ball.

In an embodiment, the motor is configured to apply forces at at least two control points on different diameters of the inner ball allowing control of at least two rotational axes. In different embodiments, the motor may be configured as a 1 or 2D ultrasonic motors, tendon-based motors, 1 or 2D induction motors or 1 or 2D electro-magnetic DC motors.

In an embodiment, the motor comprises a spherical planar motor that is configured to apply forces in a controllable two-axis direction (tangential to the inner ball) at each control point.

In an embodiment, a spherical planar DC motor comprises one or more rotor elements formed in the surface of the inner ball. Each rotor element comprises a two-dimensional pattern of rotor teeth (e.g. magnetic material or permanent magnets). At least two two-dimensional drive elements are positioned adjacent to control points on different diameters of the inner ball. Each drive element comprises a two-dimensional array of controllable drive heads arranged substantially parallel to, but non-contacting, the adjacent portion of the inner ball and the two-dimensional pattern of rotor teeth. The center-to-center spacing of the drive heads being less than the center-to-center spacing of the teeth. A position measurement device is configured to determine the rotational position of the inner ball, hence the placement of the rotor teeth relative to the drive heads. A processor is configured to determine from a pointing command and the rotational position of the ball the energization of the drive heads within each drive element that act upon the adjacent rotor teeth to produce commanded two-dimensional forces in planes tangent to the inner ball at the at least two control points to rotate the inner ball within the socket to point the pointing axis. A controller is configured to apply the determined energization to the drive heads to drive the inner ball to slew the pointing axis in accordance with the pointing command.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a ball joint gimbal imaging system with an off-gimbal directional EO component in which on-gimbal optics reimage the front optical aperture to a smaller back optical aperture that moves with the rotation of the inner ball. Reimaging to the smaller back optical aperture may reduce the packaging volume required for the relay optics. Relay optics are configured to relay the back optical aperture to the EO component. A relay optics system comprises a first two-axis steering element that is positioned and sized to cover the range of motion of the beam from the back optical aperture across the range of gimbal motion. The first two-axis steering element is controlled to steer the optical beam passing through the back optical aperture into a second two-axis steering element that is controlled to tilt the optical beam to substantially align light along the central axis of the electro-optic element with the central axis of the front optical aperture (coincident with the pointing axis) on the inner ball. The first steering element may be mounted either on or off-gimbal. The second steering element is mounted off-gimbal on the platform. Components mounted off-gimbal, on the platform may be mounted either directly or indirectly to the platform to move with the platform.

Figure 1:
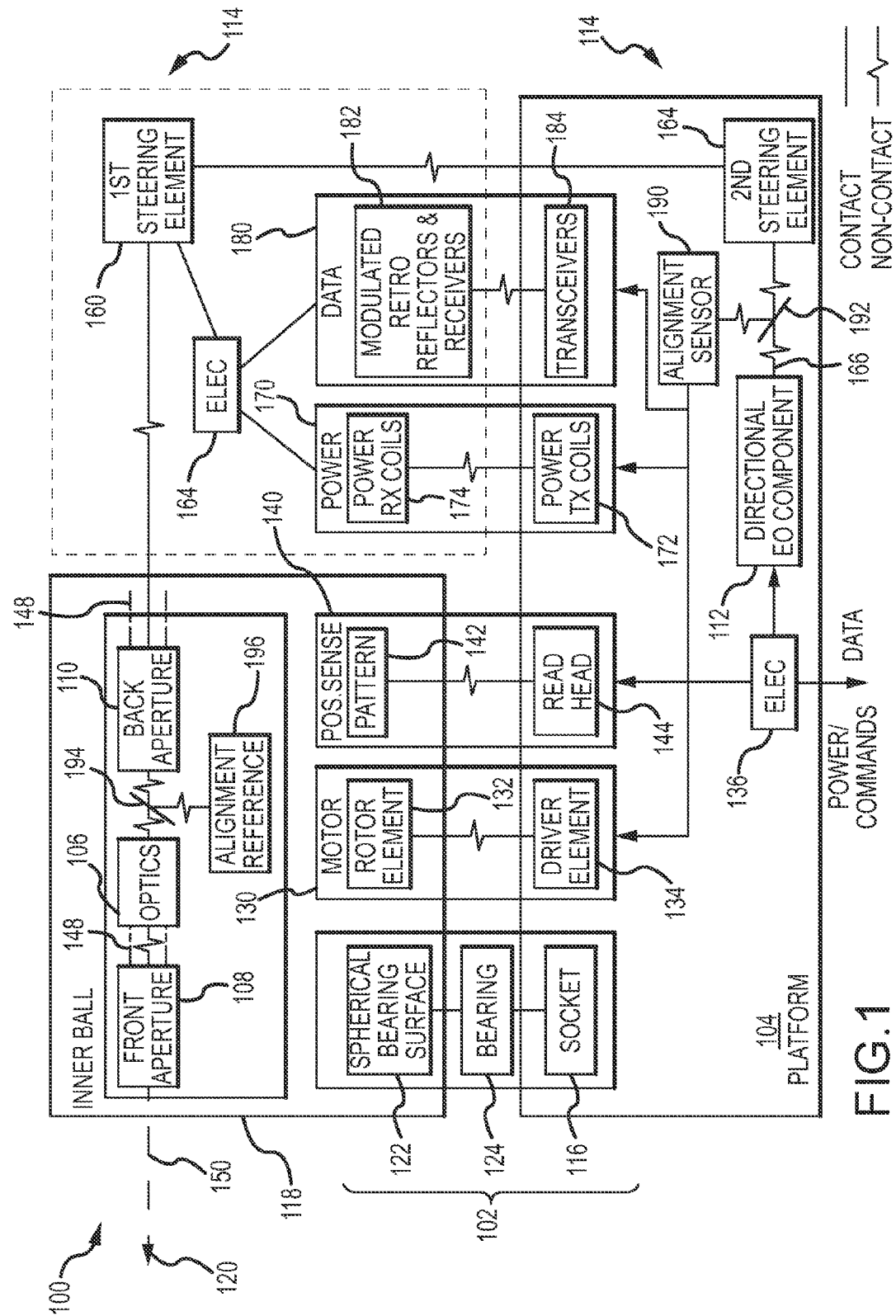
FIG. 1 is a block diagram of a ball joint gimbal imaging system with an off-gimbal directional EO component.

As shown in FIG. 1, an embodiment of a ball joint gimbal electro-optic system 100 comprises a ball joint gimbal 102 mounted on a platform 104, on-gimbal optics 106 that reimage a front optical aperture 108 to a smaller back optical aperture 110, a directional EO component 112 mounted on the platform, relay optics system 114 that relay the back optical aperture 110 to the EO component 112 and various subsystems to control operation of the ball joint gimbal, relay optics system and the directional EO component.

The ball joint gimbal 102 includes a socket 116 mounted on the platform and an inner ball 118 captured within the socket and free to rotate about combinations of three orthogonal axes to point a pointing axis 120. The outer surface of inner ball 118 comprises a bearing surface 122 configured as a partial sphere. Bearing surface 122 is held within socket 116 by a bearing 124 (and other mechanisms, such as tendons, in some embodiments). The socket 116 comprises one or more portions of a spherical surface that constrain the position (but not the rotation) of the inner ball 118.

The inner ball 118 and socket 116 may be single spherical segments (spheres with the top and bottom removed), and the bearing 124 may comprise individual bearings. In an alternate embodiment the inner ball and socket are also spherical segments, and the bearing comprises rigid ball bearings held separated from each other by a cage (which tends to limit roll motion). When greater range of travel is required, the socket may consist of multiple discrete patches configured so that the ball bearings may recirculate from one side of a patch to the other as the inner ball moves. Bearing 124 may be configured as an air bearing, or the inner ball 118 may be actively magnetically levitated within the socket.

A motor 130 is configured to apply forces to rotate inner ball 118 within the socket 116 to point the pointing axis 120. In an embodiment, the motor applies forces at at least two control points on different diameters of the inner ball allowing control of at least two rotational axes. In different embodiments, the motor may be configured as a 1 or 2D ultrasonic motors, tendon-based motors, 1 or 2D induction motors or 1 or 2D electro-magnetic DC motors. The ultrasonic, induction and DC motors may be configured to provide full three-axis control.

As depicted in this embodiment, a non-contacting electromagnetic spherical planar DC motor 130 comprises one or more rotor elements 132 formed in the surface of the inner ball 118. Each rotor element comprises a two-dimensional pattern of rotor teeth (magnetic material or permanent magnet). At least two two-dimensional drive elements 134 are positioned adjacent to control points on different diameters of the inner ball. Each drive element comprises a two-dimensional array of controllable drive heads arranged substantially parallel to, but non-contacting, the adjacent portion of the inner ball and the two-dimensional pattern of rotor teeth. The center-to-center spacing of the drive heads being less than the center-to-center spacing of the rotor teeth. Electronics 136 are configured to determine from a pointing command and the rotational position of the ball the energization of the drive heads within each drive element that act upon the adjacent rotor teeth to produce commanded two-dimensional forces in planes tangent to the inner ball substantially at the at least two control points to rotate the inner ball within the socket to point the pointing axis. Electronics 136 apply the determined energization to the drive heads.

A position measurement device 140 is configured to determine the rotational position of the inner ball. The rotational position is used to control both the motor and the steering elements of the relay optics system.

Several options are available for directly reading the rotational position of the inner ball relative to the socket and platform. Bailey US20040089083 describes a method where globally unique patterns 142 at different points along the surface of the inner ball are read by read heads 144 positioned adjacent the ball. As necessary, additional patterns and read heads may be included to maintain all-axis visibility over the FOR. Using foreknowledge of the placement of these patterns on the ball and of the read heads on the base, the rotational position of the ball relative to the platform may be calculated. This is an absolute, vs. incremental, encoding method in that knowledge of previous rotational positions of the ball are not necessary to unambiguously calculate the current position.

Incremental coding is another option. In a typical incremental encoder, absolute position is determined by moving until a reference mark is reached, and then relative position is determined from there. Absolute/incremental coding, as in U.S. Pat. No. 7,034,283 Williams, is a hybrid approach. It simplifies the sensors, allowing a smaller field-of-view where the observed portion of the pattern at any one time is not globally unique. But, but the pattern is configured so that a limited amount of motion (vs. returning all the way to a fixed reference), allows the absolute position to be determined from prior context. Alternate embodiments include induction coupling as in a resolver (using different frequencies for the two axis), feedback from the drive system as subsequently discussed, or may use a single optical sensor with a larger field of view to obtain roll.

On-gimbal optics 106 reimage an optical beam 148 from front optical aperture 108 to a smaller back optical aperture 110 that moves relative to the platform 104 with the rotation of the inner ball 118. Front optical aperture 108 has a central axis 150 that is coincident with pointing axis 120. Reducing the aperture is key to packaging the downstream relay optics in a smaller volume.

Relay optics system 114 relays the back optical aperture 110 to the EO component 112. Relay optics system 114 comprise a first two-axis steering element 160 that is positioned and sized to cover the range of motion of the optical beam 148 from the back optical aperture 110 across the range of gimbal motion, a second two-axis steering element 162 mounted to the platform 104 and a controller (electronics 136 and electronics 164) configured to drive the first and second steering elements. The controller is responsive to the rotational position of the inner ball to drive the first steering element to steer the optical beam 148 passing through the back optical aperture 110 into the second two-axis steering element 160 and to drive the second steering element 162 to tilt the optical beam 148 to substantially align light along the a central axis 166 of the electro-optic element 112 with the central axis 150 of the front optical aperture 108 (coincident with the pointing axis 120) on the inner ball. The effect of relay optics system 114 is to effectively place EO element 112 at the back optical aperture.

First two-axis steering element 160 may be positioned either on platform 104 or on inner ball 118. If positioned on the platform, steering element 160 can receive power and control signals directly from electronics 164 on the platform. If positioned on the inner ball, power must be provided to the inner ball to power the steering element and the drive signals must be communicated from the platform onto the inner ball.

A power source 170 may be configured to supply power to the inner ball 118 without physical connection (other than possibly a few wires) to the platform (possibly including a ground through the bearings). In an implementation, power source 170 may comprise a battery placed within the inner ball. The battery contacts the inner ball but does not create a physical connection between the platform or a component off of the inner ball, hence is "non-contacting". In other applications, power may be transferred into the ball via non-contact means. In the embodiment illustrated, power is transferred via electromagnetic induction, with transmitting coils 172 placed around (and spaced away from) the inner ball and receiving coils 174 placed on and around the rear of the inner ball. In some embodiments, multiple coils at different locations on the inner ball may be used to assure that at least one is receiving power at any given ball position. In alternative embodiments power may be supplied optically, or the ball may be powered by capturing energy from the vibration of the system.

A data path 180 is provided from platform 104 to inner ball 118 to communicate the drive signals to electronics 164 on the inner ball to drive the steering element 160. In an embodiment, modulated retro reflectors and receivers 182 are positioned along the back surface of the ball. Transceivers 184 on the platform illuminate the retro reflector, and receive and decode the modulated data. When the maximum range of gimbal travel is within the overlap between the acceptance angle of a single retro reflector and the operating angle of a single transceiver, only one data source is required. When the range is larger, multiple retro reflectors may be used, so that at least one is always in view. The same coded signal may be sent to all. Since these retro-reflectors consume nearly no power and are inexpensive, this may be less costly than other alternatives. A bi-directional path allows the drive signals to be communicated to the inner ball and position information for the steering element 160 to be feedback to the platform.

A variety of alternate embodiments will be obvious to one of normal skill in the art. For example, conventional wireless communication, such as 802.11.g, Bluetooth, or near-field wireless communication may be used. Or data may be modulated onto the resolver signal, providing dual-use for the coils. To simply communicate data to the ball, optical pickups on the ball (spaced as were the retro-reflectors) can receive a modulated source from the platform.

In an embodiment, the controller is configured to drive the first steering element 160 to pre-compensate for wander of an input aperture of the second steering element 162 as the steering of the second steering element changes.

In an embodiment, the system further comprises an alignment measurement sensor 190 configured to measure residual misalignment of the optical path through the first and second steering elements between the axis of the front optical aperture and the axis of the EO element. In some embodiments the alignment sensor 190 comprises an auto-collimator operating outside the optical passband of the directional EO element 112. A collimated alignment beam emitting from the autocollimator may be mixed into the optical path by a chromatic beam splitter 192. The alignment beam is redirected along with the primary optical beam by the 2nd and 1st steering elements 162 and 160 before passing into the back aperture 110. There, a second dichroic beam splitter 194 may fold the alignment beam into a reflective alignment reference 196, after which the alignment beam follows the path back to the alignment sensor 190, where the wavefront tilt is measured to determine the accumulated misalignment through the optical path. The control may use the accumulated misalignment to adjust the drive signals to the first or second steering elements to reduce the misalignment.

In an embodiment, the second two-axis steering element is controlled to provide Vernier stabilization. The line of sight (axis of the EO component) is intentionally slightly misaligned with the axis of the front aperture to keep it stable in the external object space as the ball unintentionally jitters. In an embodiment, an inertial angle rate sensor is positioned on the inner ball to measure angle rates of motion. The controller combines these measured angle rates of motion with the accumulated misalignment provided by the measurement sensor 194 to drive the $1^{st}$ or $2^{nd}$ steering elements to stabilize pointing of the directional EO element through the optics relative to the external scene.

Figure 2:
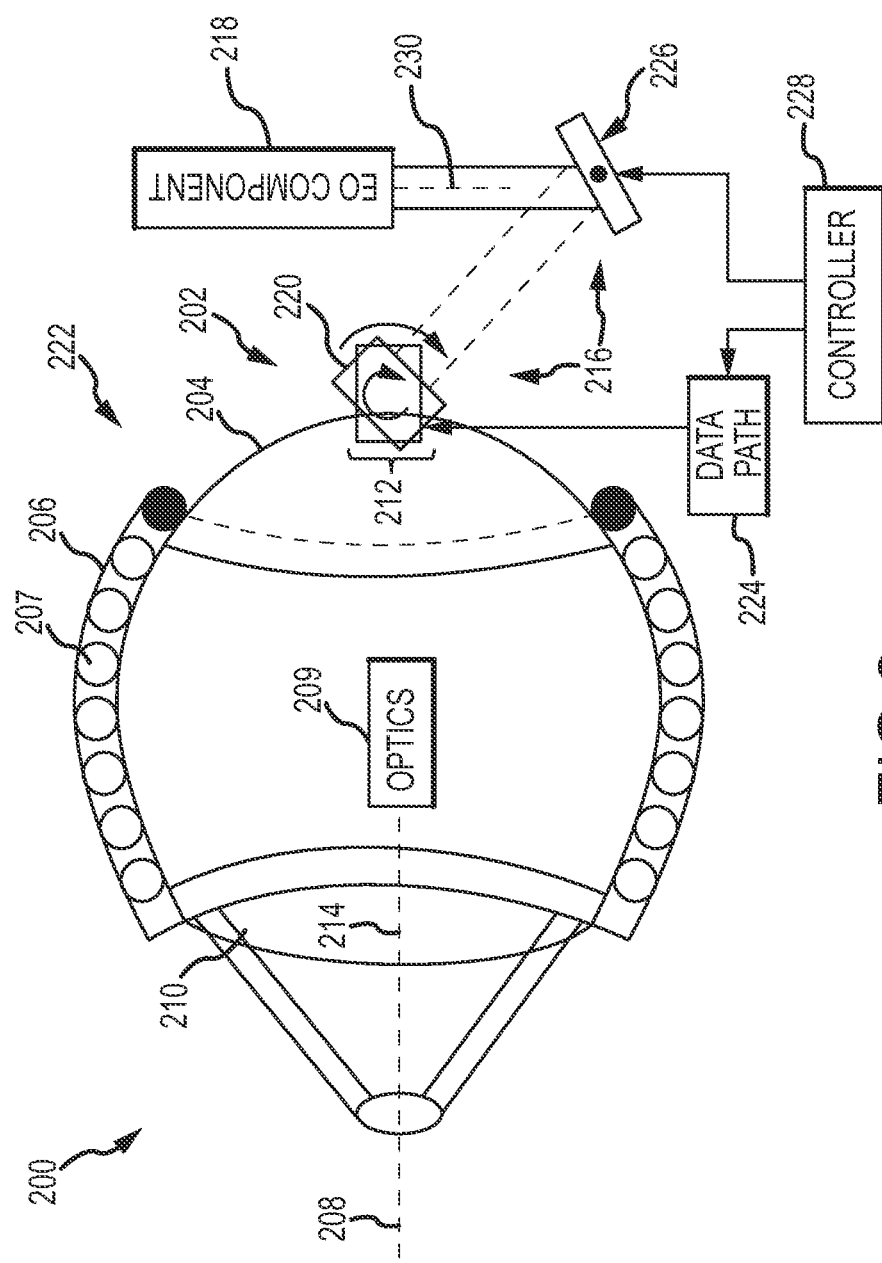
FIG. 2 is a side view of an embodiment of the ball joint gimbal imaging system including the relay optics to relay the optical beam to the off-gimbal EO component in which the first steering element is mounted off-gimbal.

An embodiment of a ball joint gimbal EO system 200 in which a first two-axis element 202 is mounted on an inner ball 204 is illustrated in FIG. 2. Inner ball 204 is captured within a socket 206 and free to rotate on bearings 207 about combinations of three orthogonal axes to point a pointing axis 208. On-gimbal optics 209 reimage an optical beam from a front optical aperture 210 to a smaller back optical aperture 212 that moves relative to the platform with the rotation of the inner ball. Front optical aperture 210 has a central axis 214 that is coincident with pointing axis 208.

Relay optics system 216 relays the back optical aperture 212 to an EO component 218. Relay optics system 216 comprise the first two-axis steering element 202 that is positioned on the inner ball at the back aperture 212 and sized to cover the optical beam at the back optical aperture 110 across the range of gimbal motion. As shown, the two-axis steering element 202 may comprise two-axis roll-nod prisms 220. A non-contacting power source 222 supplies power to the inner ball to power the first two-axis steering element. A non-contacting data path 224 is provided from the off-gimbal control system to drive the first two-axis steering element, and possibly to provide feedback on the position of the steering element. Relay optics system 216 further comprises a second two-axis steering element 226 that is mounted on the platform.

A controller 228 is configured to drive the first and second steering elements to compensate for motion of the inner ball. The controller is responsive to the rotational position of the inner ball to drive the first steering element to steer the optical beam passing through the back optical aperture 212 into the second two-axis steering element 226 and to drive the second steering element 226 to tilt the optical beam to substantially align light along the a central axis 230 of the electro-optic element 218 with the central axis 214 of the front optical aperture 210 (coincident with the pointing axis 208) on the inner ball. The effect of relay optics system 216 is to effectively place EO element 218 at the back optical aperture 212 over the gimbal range of motion.

Figure 3:
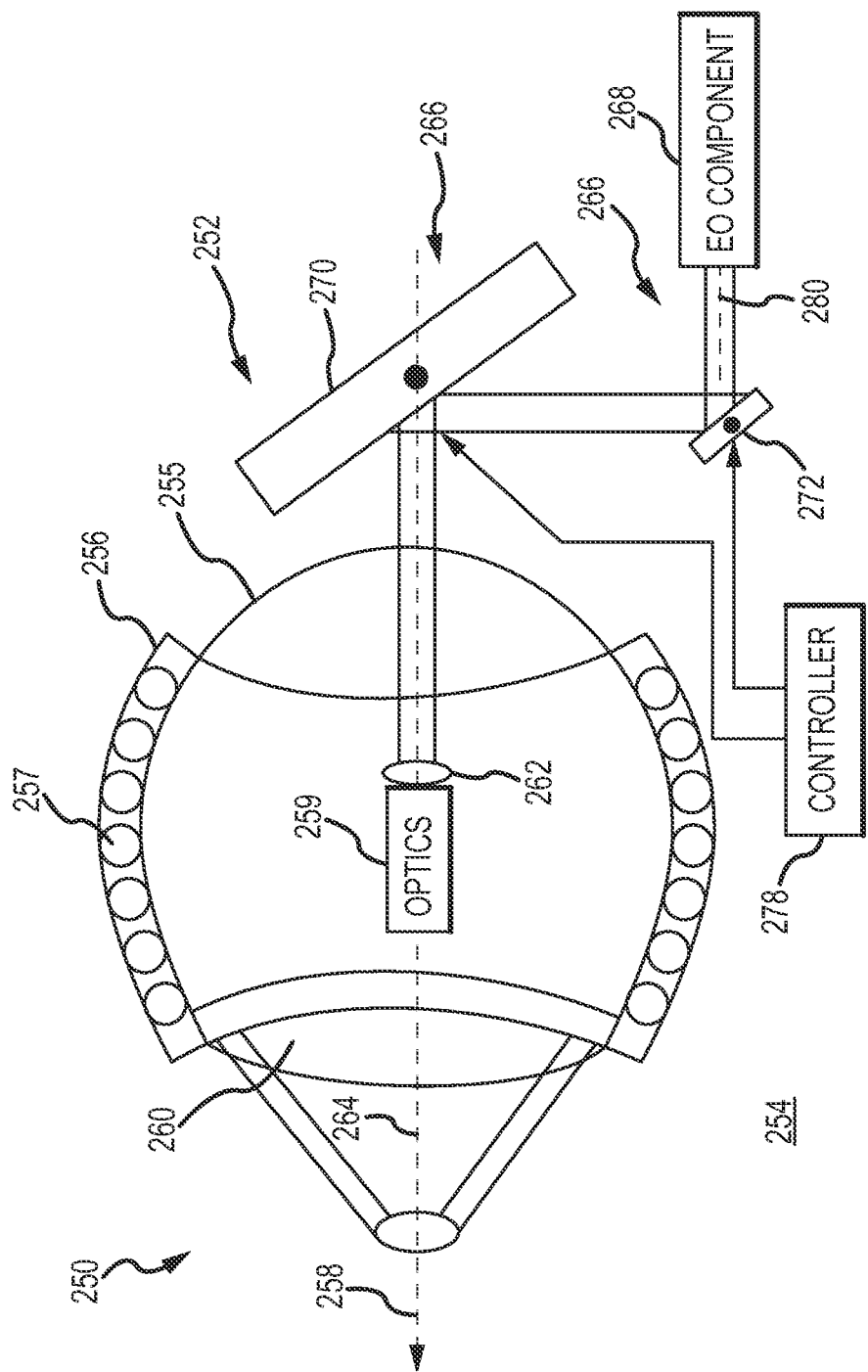
FIG. 3 is a side view of another embodiment of the ball joint gimbal imaging system including the relay optics to relay the optical beam to the off-gimbal EO component in which the first steering element is mounted on-gimbal.

An embodiment of a ball joint gimbal EO system 250 in which a first two-axis element 252 is mounted on a platform 254 is illustrated in FIG. 3. An inner ball 255 is captured within a socket 256 and free to rotate on bearings 257 about combinations of three orthogonal axes to point a pointing axis 258. On-gimbal optics 259 reimage an optical beam from a front optical aperture 260 to a smaller back optical aperture 262 that moves relative to the platform with the rotation of the inner ball. Front optical aperture 260 has a central axis 264 that is coincident with pointing axis 258.

Relay optics system 266 relays the back optical aperture 262 to an EO component 268. Relay optics system 266 comprises the first two-axis steering element 252 on platform 254 that is positioned and sized to cover the optical beam at the back optical aperture 262 across the range of gimbal motion. As shown, the two-axis steering element 252 may comprise a two-axis steering mirror 270. Relay optics system 266 further comprises a second two-axis steering element 272 that is mounted on the platform. The second two-axis steering element may also comprise a two-axis steering mirror.

A controller 278 is configured to drive the first and second steering elements to compensate for motion of the inner ball. The controller is responsive to the rotational position of the inner ball to drive the first steering element 252 to steer the optical beam passing through the back optical aperture 262 into the second two-axis steering element 262 and to drive the second steering element 262 to tilt the optical beam to substantially align light along the a central axis 280 of the electro-optic element 268 with the central axis 264 of the front optical aperture 260 (coincident with the pointing axis 258) on the inner ball. The effect of relay optics system 266 is to effectively place EO element 268 at the back optical aperture 262 over the gimbal range of motion.

The motor is configured to apply forces to rotate inner ball within the socket to point the pointing axis. In an embodiment, the motor applies forces at at least two control points on different diameters of the inner ball allowing control of at least two rotational axes. In different embodiments, the motor may be configured as a 1 or 2D ultrasonic motors, tendon-based motors, 1 or 2D induction motors or 1 or 2D electro-magnetic DC motors. The ultrasonic, induction and DC motors may be configured to provide full three-axis control.

In an embodiment, a pair of ultrasonic drive motors are placed in direct contact with inner ball to apply rotational forces about contact points along orthogonal axes (e.g. Az and El) to control two-axis pointing of pointing axis. A third ultrasonic drive motor may be placed in direct contact with inner ball to provide a third control axis. Each ultrasonic drive motor creates torque by causing a traveling wave in annual metallic elastic body to which piezoelectric elements are glued. This wave is created as each point on the annulus to moves in a small ellipse, back and forth along the circumference of the annulus, and up and down along its axis. The direction and speed of the traveling wave is determined by the phase differences of this motion at points along the circumference. At the bottom of each elliptical cycle, different points along the annulus contact the ball and push it circumferentially about the annulus, like twisting a bottle cap. See Masa-hiko Hoshina et al "Development of Spherical Ultrasonic Motor as a Camera Actuator for Pipe Inspection Robot" The 2009 IEEE/RSJ International Conference on Intelligent Robots and Systems, Oct. 11-15, 2009 St. Louis, USA.

Another approach modeled after the human eye uses multiple tendons attached to the surface of the inner ball of a ball joint gimbal. Rather than applying a rotational force about a contact point, this type of controller applies tangential forces along the surface of the ball at each contact point. Tendons can only pull, specifically in the direction of the tendon. Multiple tendons must act together to provide rotation in an arbitrary direction, or even back and forth motion in the same axis (opposing directions). Three tendons can provide full two-axis control, although four are typically used. Similar to the nested gimbal, the third rotational axis is kinematically constrained by these tendons, just not as rigidly (because roll motion is largely perpendicular to the tendon axes). Examples of this approach are provided in U.S. Pat. Nos. 6,326,759 and 7,032,469.

Another approach uses linear electro-magnetic DC motor technology to apply tangential forces along predetermines axes to control the inner ball of a ball joint gimbal in three dimensions simultaneously.

Figure 4:
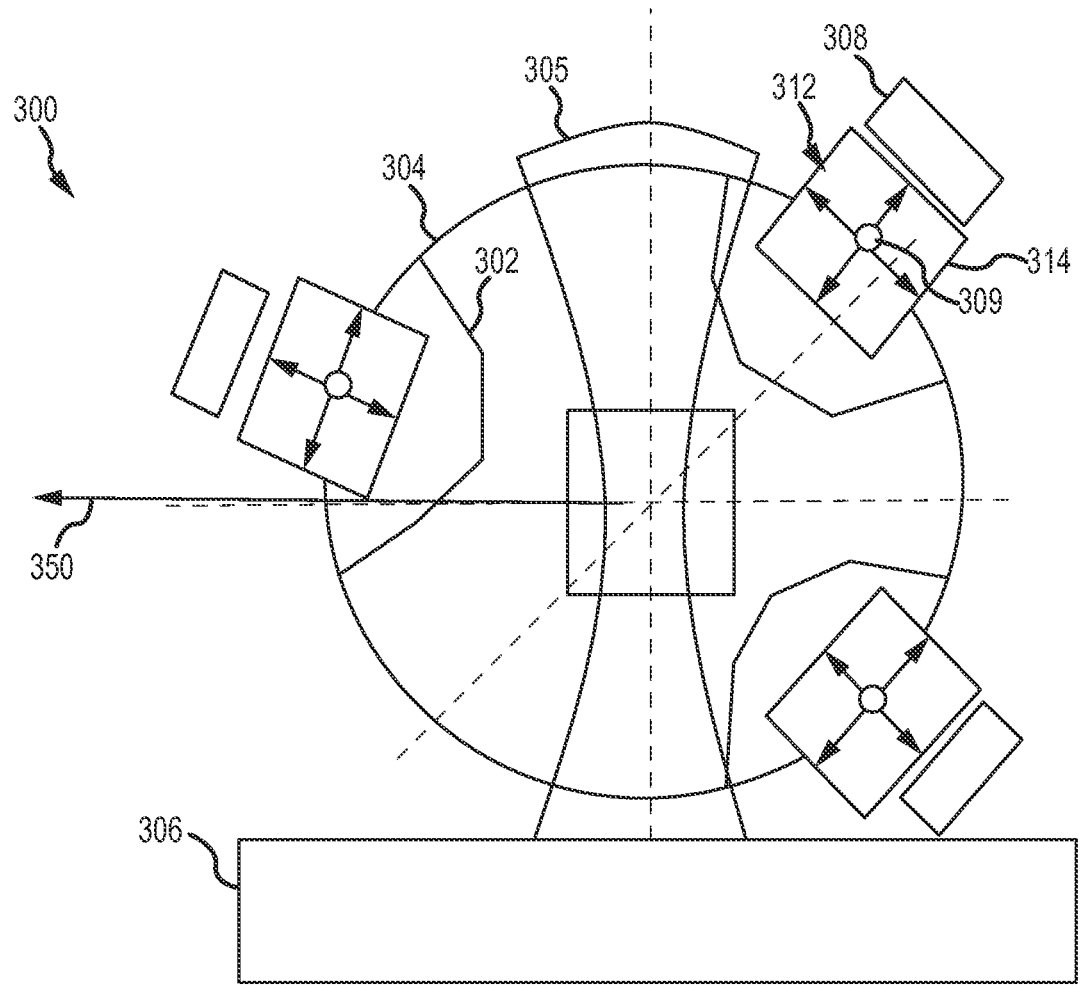
FIGS. 4 through 6 are different views of a spherical planar motor configured to rotate the inner ball to control the pointing axis.
Figure 5:
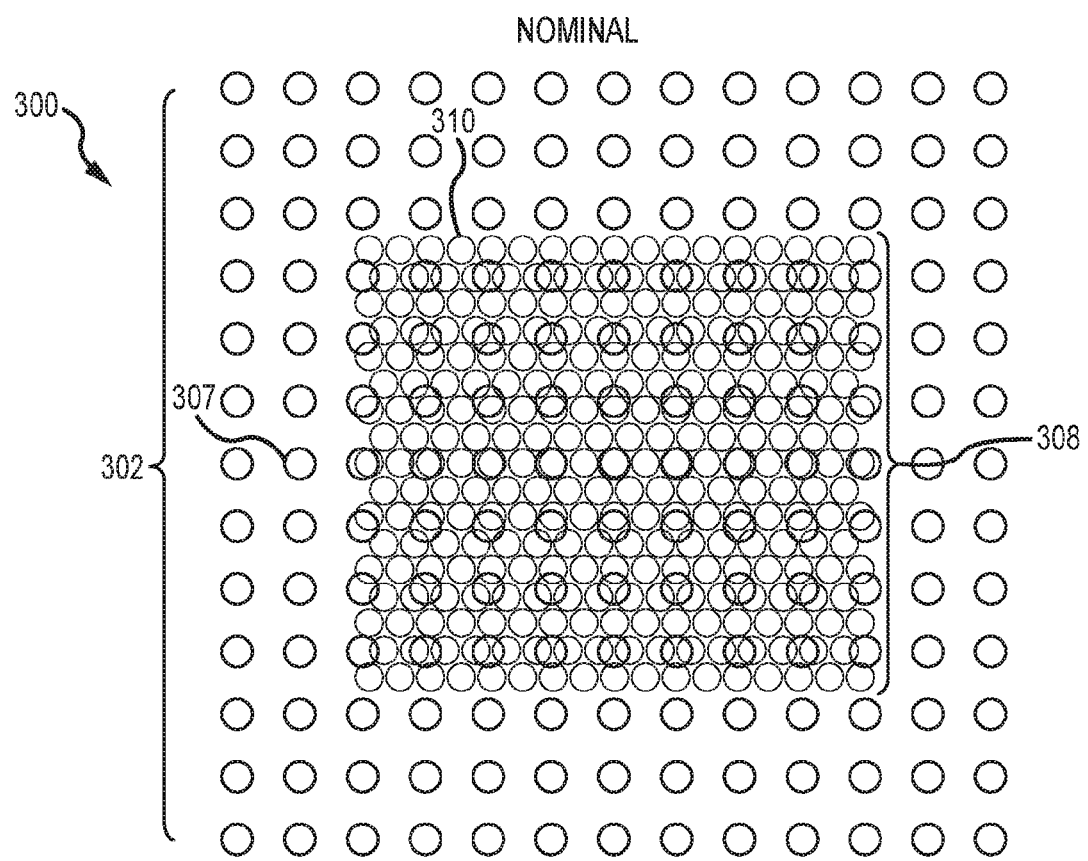
Figure 6:
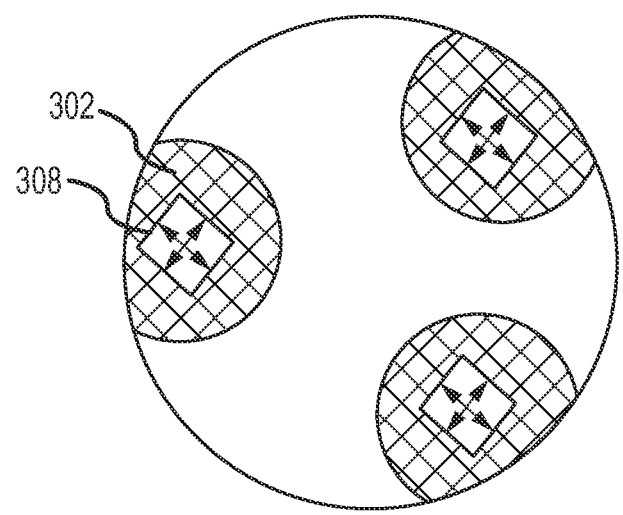

As illustrated in FIGS. 4 through 6, another approach uses a spherical planar electro-magnetic DC motor technology to apply two-dimensional forces in arbitrary and controllable directions within planes tangential to the inner ball at at least two control points on different diameters of the inner ball. These figures only illustrate the motor. The optics, relay optics and other subsystems are not shown.

The spherical planar DC motor is similar to a planar Sawyer motor described in U.S. Pat. No. 3,376,578 wrapped onto a spherical surface. Modifications are made to the Sawyer motor design to accommodate the spherical shape.

A spherical planar motor 300 comprises one or more rotor elements 302 formed in the surface of an inner ball 304 captured in a socket 305 on a platform 306. The motor applies forces to the inner ball to rotate the ball and point a pointing axis 350. Each rotor element 302 comprises a two-dimensional pattern of rotor teeth 307 (e.g. magnetic material or permanent magnets). Sawyer's square teeth may be suitably replaced with circular teeth to improve the packing of teeth onto the spherical surface of the inner ball and the overall uniformity of the teeth. At least two two-dimensional drive elements 308 are positioned adjacent to control points 309 on different diameters of the inner ball. Each drive element 308 comprises a two-dimensional array of controllable drive heads 310 arranged substantially parallel to, but non-contacting, the adjacent portion of the inner ball and the two-dimensional pattern of rotor teeth.

In order to produce forces 312 on the teeth in arbitrary and controllable directions within a tangential plane 314, the center-to-center spacing between drive heads is on the order of or less than the center-to-center spacing between teeth. As shown here, the spacing between driver head is less than ½ the minimum spacing between rotor teeth. These heads are configured to change the magnetic field pattern to apply force in a desired direction to the adjacent teeth as these teeth move in phase (i.e., in fractions of a tooth). This is in marked contrast to a conventional Sawyer motor which changes the drive phase by switching to coils adjacent to a different area of teeth, relying on uniform spacing between teeth to preserve relative phase (which cannot generally be guaranteed on the surface of a sphere).

Furthermore, while it may appear that this control may be determined open-loop, as in the Sawyer motor, this quickly breaks down. Wrapping the two-dimensional pattern of rotor teeth onto the spherical surface of the inner ball produces a non-uniform pattern of those rotor teeth; it cannot be avoided for any useful range of motion greater than a 20 degrees (depending upon the tooth pitch). Consequently, unlike a planar Sawyer motor the orientation of the drive heads relative to the rotor teeth is a function of the rotational position of the inner ball. It follows that the energization of the particular drive heads to produce a commanded two-dimensional force is also a function of the rotational position of the inner ball. The pattern of energization of the drive heads in a drive element to produce the same commanded two-dimensional force will change with the rotational position of the inner ball.

Therefore, a position measurement device is configured to determine the rotational position of the inner ball, hence the placement of the rotor teeth relative to the drive heads. A controller is configured to determine from a pointing command and the rotational position of the ball the energization of the drive heads within each drive element that act upon the adjacent rotor teeth to produce commanded two-dimensional forces in planes tangent to the inner ball at the at least two control points to rotate the inner ball within the socket to point the pointing axis. A controller is configured to apply the determined energization to the drive heads to drive the inner ball to slew the pointing axis in accordance with the pointing command.

In general, at least two drive elements 308 must be positioned over toothed areas of the sphere at all valid rotational positions of the inner ball in the FOR. The desired FOR defines the extent of the one or more rotor elements 302 that is required to ensure this condition over the FOR. The motor configuration is not limited to tying each drive element to a paired rotor element. In different configurations, as the inner ball rotates over the FOR the same rotor element may be pushed on my multiple drive elements or, equivalently, different drive elements can push on the same teeth when the ball is in different rotational positions. This allows for a much larger range of motion.

Each of three drive elements 308 is nominally positioned over one of three rotor elements 302. In one configuration, the extents of the rotor elements 302 are defined such that over the allowed range of motion each drive element 308 remains positioned over the corresponding rotor element 282. More specifically, the angular extent of each rotor element is substantially less than the angular spacing between control points. The amount of motion and FOR is thus limited by the extents of the rotor elements to be less than the spacing between control points (with some margin for the width of the drive element).

In another configuration, the extents of the rotor element 302 or elements are defined such that as the inner ball rotates at least two drive elements 308 remain over rotor elements 302 but the third rotor element may rotate to an uncovered position. As the inner ball continues to rotate, the third rotor element may again find a covered position over the same or a different rotor element 302. A different one of the drive elements may rotate to an uncovered position and so forth as long as at least two of the drive elements are covered. Such a configuration may allow for a much larger FOR, greater than the angular spacing between control points, than would be provided by the extents of each rotor element if the drive elements were required to remain paired with a particular rotor element. Alternately, a single rotor element 302 is configured to cover a large extent of the inner ball. The three drive elements 308 are positioned adjacent and over different teeth in the shared global tooth pattern. In general, if the motor includes N drive elements such that the angular spacing between control points is less than the angular extent of the rotor elements, the inner ball should be able to freely rotate over a large FOR as the drive elements move from one rotor element to the next.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A ball joint gimbal electro-optic system, comprising:
a platform;
a ball gimbal mounted on the platform, said ball gimbal including a socket fixedly mounted on the platform and an inner ball captured within the socket and free to rotate about combinations of three orthogonal axes to point a pointing axis within a range of gimbal motion;
a directional electro-optic element mounted on the platform, off-gimbal;
optics mounted within the inner ball, said optics having a central axis substantially coincident with the pointing axis, said optics configured to reimage an optical beam from a front optical aperture to a smaller back optical aperture that moves relative to the platform with the rotation of the inner ball;
a motor configured to apply forces to rotate the inner ball within the socket to point the pointing axis;
a position measurement device configured to determine a rotational position of the inner ball with respect to the platform; and
a relay optics system in an optical path of the optical beam between the back optical aperture and the directional electro-optic element to relay the optical beam from the back optical aperture to the electro-optic element, said relay optics system comprising,
a first two-axis steering element that is positioned and sized to cover any beam formed from the back optical aperture across the range of gimbal motion; and
a second two-axis steering element mounted to the platform; and
a controller configured to drive the first and second steering elements;
wherein said controller is responsive to the rotational position of the inner ball to drive the first steering element to steer the optical beam passing through the back optical aperture into the second two-axis steering element and to drive the second two-axis steering element to tilt the optical beam to align light along a central axis of the electro-optic element substantially with the central axis of the front optical aperture on the inner ball.

2. The ball joint gimbal electro-optic system of claim 1, wherein there is no other physical element between the inner ball and the socket or there is a bearing between the inner ball and socket.

3. The ball joint gimbal electro-optic system of claim 1, wherein the first two-axis steering element is mounted on the platform, off-gimbal.

4. The ball joint gimbal electro-optic system of claim 1, wherein the first two-axis steering element is mounted on the inner ball, on-gimbal.

5. The ball joint gimbal electro-optic system of claim 1, wherein the controller is configured to drive the first steering element to pre-compensate for wander of an input aperture of the second steering element as the steering of the second steering element changes.

6. The ball joint gimbal electro-optic system of claim 1, further comprising:
an alignment measurement element configured to measure residual misalignment of the optical path through the first and second steering elements between the central axis of the front optical aperture and an axis of the directional electro-optic element, said controller responds to the residual misalignment to drive the first and second two-axis steering elements to reduce the residual misalignment.

7. The ball joint gimbal electro-optic system of claim 1, wherein the position measurement device comprises a non-contacting position measurement device.

8. The ball joint gimbal electro-optic system of claim 1, wherein the motor comprises at least first and second ultrasonic drive motors placed in direct contact with the inner ball to apply rotational forces about control points along first and second orthogonal axes.

9. The ball joint gimbal electro-optic system of claim 1, wherein the motor comprises a spherical planar motor having a plurality of two-dimensional drive elements configured to apply non-contacting electro-magnetic forces in planes tangential to the inner ball at at least two control points on different positions of a surface of the inner ball and not at opposite ends of a line through the center of the inner ball in commanded two-dimensional directions to rotate the inner ball within the socket to point the pointing axis.

10. The ball joint gimbal electro-optic system of claim 3, wherein there are no electrically powered components mounted on-gimbal.

11. The ball joint gimbal electro-optic system of claim 4, wherein the first two-axis steering element comprises roll-nod prisms.

12. The ball joint gimbal electro-optic system of claim 4, further comprising:
a non-contacting power source configured to power the first two-axis steering element on the inner ball; and
a non-contacting data path from the controller on the platform to the inner ball to provide control data to drive the first two-axis steering element.

13. The ball joint gimbal electro-optic system of claim 6, wherein the alignment measurement element comprises an optical auto-collimator folded in to share the optical path between the directional electro-optic element and the front aperture, passing through the first and second steering elements and into a reflector on the inner ball, and configured to measure the misalignment between the pointing axis and the axis of the directional electro-optic element.

14. The ball joint gimbal electro-optic system of claim 6, also comprising an angle rate sensor mounted on the inner ball, wherein the controller is configured to drive at least one of said first and second two-axis steering elements based upon a signal from the alignment measurement element and the rate sensor to provide Vernier stabilization for scene motion across the directional electro-optic element.

15. The ball joint gimbal electro-optic system of claim 9, wherein said spherical planar motor comprises:
   one or more rotor elements formed in the surface of the inner ball, each said rotor element comprising a two-dimensional pattern of rotor teeth;
   at least two of said two-dimensional drive elements positioned adjacent to the control points on different positions of the surface of the inner ball, each said drive element comprising a two-dimensional array of controllable drive heads arranged substantially parallel to, but non-contacting, the adjacent portion of the inner ball and the two-dimensional pattern of rotor teeth;
   a processor configured to determine from a pointing command and the rotational position of the ball the energization of the drive heads within each drive element that act upon the adjacent rotor teeth to produce commanded two-dimensional forces in planes tangent to the inner ball substantially at the at least two control points to rotate the inner ball within the socket to point the pointing axis; and
   a motor controller configured to apply the determined energization to the drive heads.

16. The ball joint gimbal electro-optic system of claim 15, wherein a center-to-center spacing of the drive heads in each drive element is less than a center-to-center spacing of the rotor teeth.

* * * * *